(12) United States Patent
Hyun

(10) Patent No.: US 11,013,223 B2
(45) Date of Patent: May 25, 2021

(54) FISHING REEL FOR EASY DISTANCE ADJUSTMENT OF TENSION NUT

(71) Applicant: DOYO ENGINEERING CO., LTD., Bucheon (KR)

(72) Inventor: Kang Ho Hyun, Bucheon (KR)

(73) Assignee: DOYO ENGINEERING CO., LTD., Bucheon (KR)

( * ) Notice: Subject to any disclaimer, the term of this patent is extended or adjusted under 35 U.S.C. 154(b) by 79 days.

(21) Appl. No.: 16/672,972

(22) Filed: Nov. 4, 2019

(65) Prior Publication Data

US 2020/0137996 A1    May 7, 2020

(30) Foreign Application Priority Data

Nov. 5, 2018 (KR) .......................... 10-2018-0134191

(51) Int. Cl.
*A01K 89/01* (2006.01)
*A01K 89/027* (2006.01)

(52) U.S. Cl.
CPC .................................. *A01K 89/03* (2015.05)

(58) Field of Classification Search
CPC ..... A01K 89/029; A01K 89/03; A01K 89/057
See application file for complete search history.

(56) References Cited

U.S. PATENT DOCUMENTS

| | | | | | |
|---|---|---|---|---|---|
| 3,549,103 | A | * | 12/1970 | Sarah ................. | A01K 89/0155 242/290 |
| 5,669,296 | A | * | 9/1997 | Newton .................... | B30B 1/18 100/231 |
| 5,950,949 | A | * | 9/1999 | Cockerham ........ | A01K 89/0155 242/289 |
| 2017/0238515 | A1 | * | 8/2017 | Hyun ............... | A01K 89/01905 |

FOREIGN PATENT DOCUMENTS

| | | |
|---|---|---|
| KR | 200174205 | 3/2000 |
| KR | 2020110005400 | 6/2011 |
| KR | 101185103 | 9/2012 |
| KR | 101218315 | 1/2013 |
| KR | 101884236 | 8/2018 |

* cited by examiner

*Primary Examiner* — Emmanuel M Marcelo
(74) *Attorney, Agent, or Firm* — Cantor Colburn LLP

(57) ABSTRACT

Provided is a fishing reel. The fishing reel includes a frame having a nut mounting part, a tension nut screwed to the nut mounting part to adjust a distance in an axial direction of a spool shaft and having a tension adjusting part therein to press a first end of the spool shaft and thereby adjust rotating force of the spool, a first adjustment means configured to make a moving distance per rotation of the tension nut larger or smaller than a predetermined distance, and a second adjustment means configured to make the moving distance per rotation of the tension nut smaller or larger than the predetermined distance, in opposition to the moving distance per rotation of the tension nut by the first adjustment means.

4 Claims, 18 Drawing Sheets

FISHING REEL FOR EASY DISTANCE ADJUSTMENT OF TENSION NUT

BACKGROUND OF THE INVENTION

Field of the Invention

The present invention relates to a fishing reel for easy distance adjustment of a tension nut. More particularly, the invention relates to a fishing reel for easy distance adjustment of a tension nut, which includes a frame having a nut mounting part; a tension nut screwed to the nut mounting part to adjust a distance in an axial direction of a spool shaft, and having a tension adjusting part therein to press one end of the spool shaft and thereby adjust rotating force of the spool; a first adjustment means configured to make a moving distance per rotation of the tension nut larger or smaller than a predetermined distance; and a second adjustment means configured to make the moving distance per rotation of the tension nut (TN) smaller or larger than the predetermined distance, in opposition to the moving distance per rotation of the tension nut by the first adjustment means, so that the tension nut can be more rapidly assembled via the first and the second adjustment means which are set differently in the moving distance per rotation of the tension nut, and a tension force acting on a spool can be finely controlled using the tension nut.

Description of the Related Art

Generally, a bait casting reel (hereinafter referred to as a fishing reel) is different in a spool braking method from other reels, and includes a frame 10 equipped with a spool 11, a first side cover 13 on a gear side coupled to one side of the frame 10, a second side cover 14 on a palm side coupled to the other side of the frame 10, and a handle 15 provided on the first side cover 13, as illustrated in FIG. 1.

Such a fishing reel is configured such that a tension nut (TN) applying pressure to an end of a spool shaft 12 is coupled to a nut mounting part 20 provided on the first side cover 13 to adjust the tension force of the spool 11 which a fishing line is wound around or unwound from, and thereby to adjust the rotating speed of the spool 11.

The tension force using the tension nut TN is adjusted when a user rotates the tension nut TN in opposite directions to change a screw tightening degree. To be more specific, if the tension nut TN is rotated into the nut mounting part 20 to be tightened, pressure (tension force) applied to both ends of the spool shaft 12 is increased, so that the rotating speed of the spool 11 is reduced. In contrast, if the tension nut TN is rotated out of the nut mounting part 20 to be loosened, pressure applied to both ends of the spool shaft 12 is reduced and the rotating speed of the spool 11 is increased.

As seen in the enlarged view of FIG. 1, the conventional fishing reel is problematic in that the tension nut TN and the nut mounting part 20 are provided with only single threads S1 and S2 to perform a screw-type fastening method, so that it is difficult to finely adjust the distance (i.e., tension force) of the tension nut TN. Furthermore, this fishing reel is problematic in that it takes a long time to tighten the tension nut TN by a predetermined distance when the tension nut TN is separated and then re-assembled to perform the maintenance of the fishing reel.

That is, the conventional fishing reel is configured such that the tension nut TN is fastened to the nut mounting part 20 through a single screw structure, so that a moving distance (pitch) per rotation is constant. Hence, if the pitch is long, the re-assembly of the tension nut TN is fast but it is difficult to finely adjust the distance. On the contrary, if the pitch is short, it is advantageous to finely adjust the distance but it takes a long time to re-assemble the tension nut TN.

As the related art of the tension nut TN, Korean Patent No. 10-1218315, Korean U.M. Publication No. 20-2011-0005400, Korean Patent No. 10-1185103, etc. have been proposed.

SUMMARY OF THE INVENTION

The present invention has been made in order to solve the above-mentioned problems in the prior art and an object of the present disclosure is to provide a fishing reel for easy distance adjustment of a tension nut, in which a double pitch structure having different moving distances per rotation is applied to the tension nut screwed to a nut mounting part, thus allowing the tension nut to be more rapidly assembled, and enabling a user to finely adjust the tension force.

In order to achieve the object of the present invention, the invention provides a fishing reel including a frame having a nut mounting part; a tension nut screwed to the nut mounting part to adjust a distance in an axial direction of a spool shaft, and having a tension adjusting part therein to press a first end of the spool shaft and thereby adjust rotating force of the spool; a first adjustment means configured to make a moving distance per rotation of the tension nut larger or smaller than a predetermined distance; and a second adjustment means configured to make the moving distance per rotation of the tension nut smaller or larger than the predetermined distance, in opposition to the moving distance per rotation of the tension nut by the first adjustment means.

The nut mounting part may include a first thread, and the tension nut may include a first body part having a second thread, and a third thread engaging with the first thread; and a first dial part having the tension adjusting part, and a fourth thread engaging with the second thread, wherein the first adjustment means may be composed of the first thread and the third thread, and the second adjustment means may be composed of the second thread and the fourth thread.

The nut mounting part may include a fifth thread and a sixth thread that are spaced apart from each other, the tension nut may include a seventh thread engaging with the fifth thread and an eighth thread engaging with the sixth thread, and may be configured such that the eighth thread engages with the sixth thread when the seventh thread is tightened to the fifth thread and then the tension nut is dislodged, and the first adjustment means may be composed of the fifth thread and the seventh thread, and the second adjustment means may be composed of the sixth thread and the eighth thread.

The nut mounting part may include a ninth thread, and the tension nut may include a second body part having an idle shaft, the tension adjusting part, and a tenth thread engaging with the ninth thread, a second dial part rotatably coupled to the idle shaft, and an elastic pressing member interposed between the second body part and the second dial part, exerting an elastic force to prevent the second dial part from being rotated against the second body part, thus allowing the second body part to be rotated by the second dial part when pressure is equal to or less than a predetermined pressure, and allowing the second dial part to perform idle-rotation in the second body part when the pressure is equal to or less than a predetermined pressure, wherein the first adjustment means may be composed of the ninth thread and the tenth thread, and the second adjustment means may be composed of the elastic pressing member.

The fishing reel according to the present invention is advantageous in that first and second adjustment means having different pitches are applied, so that a moving distance of a tension nut is changed through each adjustment means, and consequently, the first adjustment means with a long pitch allows the tension nut to be rapidly separated or assembled, and the second adjustment means with a short pitch finely adjusts the moving distance of the tension nut, thus allowing a user to more precisely adjust a tension force.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
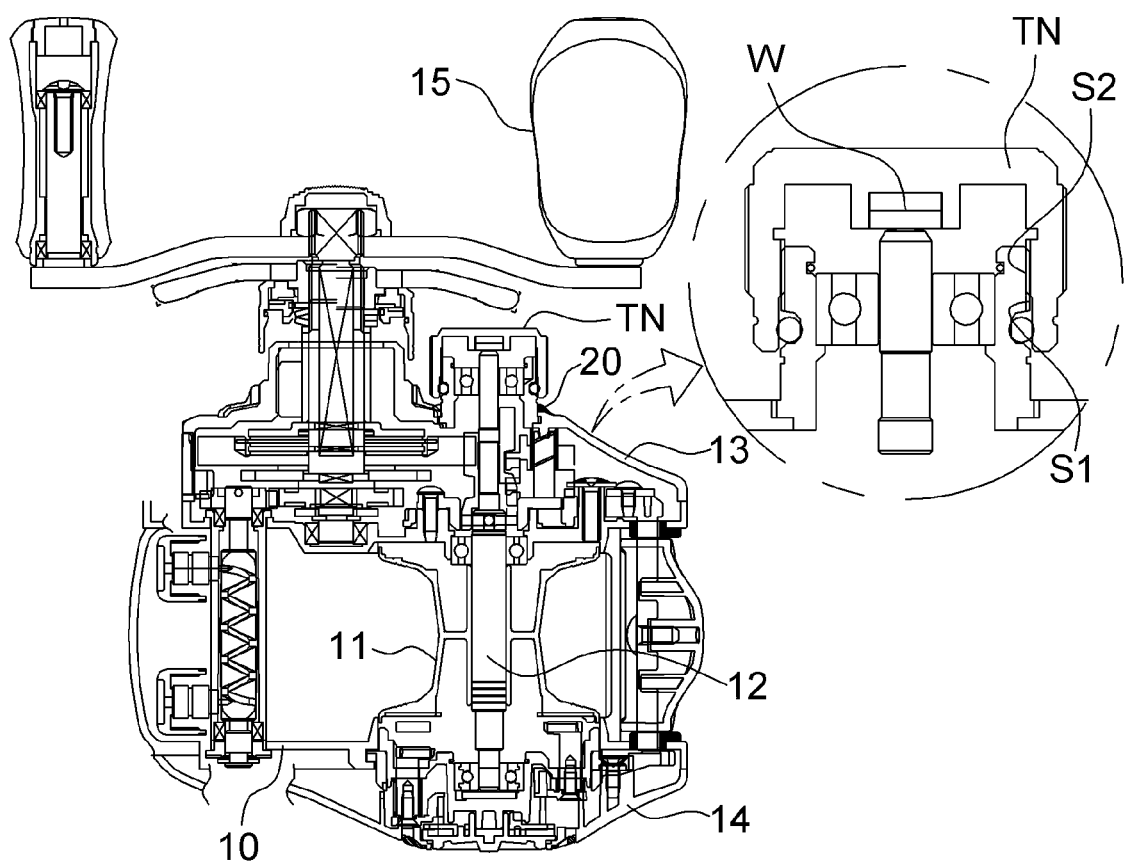
FIG. 1 is a sectional view illustrating a conventional fishing reel structure.

Since the present invention may be embodied in many different forms, aspects (or embodiments) of the invention will be described in detail herein. However, the invention should not be construed as limited to the embodiments set forth herein. Rather, all changes that fall within the bounds of the present invention, or the equivalence of the bounds are therefore intended to be embraced by the present invention.

The same reference numerals throughout the drawings, that is, the same reference numerals for the second digit or the first digit, or for the second digit, the first digit and a letter of the alphabet, denote elements having the same function. Unless otherwise specified, the elements denoted by the reference numerals are to be assumed to comply with the above-mentioned reference scheme.

In the drawings, the thicknesses of lines or the sizes of elements may be exaggerated or simplified to more clearly and conveniently illustrate the present invention, but the bounds of the present invention must not be interpreted as being limited thereto.

The terminology used herein is for the purpose of describing particular embodiments only and is not intended to be limiting. As used herein, the singular forms "a", "an", and "the" are intended to include plural forms as well, unless the context clearly indicates otherwise.

It will be further understood that the terms "comprises" and/or "comprising", or "includes" and/or "including" when used in this specification, specify the presence of stated features, numbers, steps, operations, elements, components, and/or combinations thereof, but do not preclude the presence or addition of one or more other features, numbers, steps, operations, elements, components, and/or combinations thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The ordinal numerals "first", "second", "third", etc. are used only for the sake of description and they categorically do not impose a limit on the order of production.

In the following description of a fishing reel for easy distance adjustment of a tension nut according to the present invention, for the sake of description, an approximate direction is specified with reference to FIG. 2. That is, a direction in which gravity acts is designated as a down position, and then up, down, left and right positions are designated in the drawing. Unless otherwise indicated herein, the same applies to other drawings.

Hereinafter, a fishing reel for easy distance adjustment of a tension nut according to the present invention will be described with reference to the accompanying drawings.

As illustrated in FIG. 1, the present invention relates to the fishing reel including a frame 10 that has a nut mounting part 20, 20A or 20B, and a tension nut TN that is screwed to the nut mounting part 20, 20A or 20B to adjust a distance in an axial direction of a spool shaft 12, and has a tension adjusting part W therein to press one end of the spool shaft 12 and thereby adjust rotating force of the spool 11.

As illustrated in FIGS. 2 to 18, the fishing reel of the invention includes a first adjustment means that is configured to make a moving distance per rotation of the tension nut TN larger or smaller than a predetermined distance, and a second adjustment means that is configured to make the moving distance per rotation of the tension nut TN smaller or larger than the predetermined distance, in opposition to the moving distance per rotation of the tension nut TN by the first adjustment means.

In this case, the expression "the first adjustment means is opposite in moving distance per rotation of the tension nut TN to the second adjustment means" has the following meaning: if the moving distance by the first adjustment means is larger than a predetermined distance, the moving distance by the second adjustment means is smaller than the predetermined distance, and if the moving distance by the first adjustment means is smaller than a predetermined distance, the moving distance by the second adjustment means is larger than the predetermined distance. That is, the first and second adjustment means form different moving distances per rotation of the tension nut TN. Embodiments (especially, first embodiment) will be described with a configuration where the moving distance by the first adjustment means is larger than the moving distance by the second adjustment means, but an opposite configuration is also possible.

First, as illustrated in FIGS. 2 to 5, in the first embodiment of the present invention, the nut mounting part 20 includes a first thread 21.

The tension nut TN includes a first body part 30A or 30B that has a second thread 32 and a third thread 31 engaging with the first thread 21, and a first dial part 40A or 40B that has the tension adjusting part W and a fourth thread 41 engaging with the second thread 32.

Thereby, the first adjustment means is composed of the first thread 21 and the third thread 31 (first thread fastening part, hereinafter threads engaging with each other will be referred to as each thread fastening part), and the second adjustment means is composed of the second thread 32 and the fourth thread 41 (second thread fastening part).

To be more specific, the first thread 21 is provided on an outer circumference of the nut mounting part 20, and a width of helical grooves (i.e. interval between thread teeth) of the first thread fastening part is formed larger than the predetermined distance. Thus, when the first body part 30A or 30B rotates once, the entire tension nut TN moves a relatively longer distance than the second adjustment means (e.g. about 0.40 to 0.50 mm versus the predetermined distance of 0.30 mm).

The first body part 30A or 30B has the shape of a pipe through which a hollow part 33 passes, and includes a first large diameter part 34 that is provided at an inside position (lower position when viewed from the drawing) and has a diameter corresponding to an outer diameter of the nut mounting part 20, and a first small inner diameter part 35 that is connected to an outside position (upper position when viewed from the drawing) of the first large inner diameter part 34 and has a diameter smaller than the first large inner diameter part 34. The third thread 31 is provided on the inner circumference of the first large inner diameter part 34, and the second thread 32 is provided on the inner circumference of the first small inner diameter part 35.

Here, the helical-groove width of the second thread fastening part is formed smaller than the predetermined distance. Thus, when the first dial part 40A or 40B rotates once, the first dial part 40A or 40B moves a relatively shorter distance than the first adjustment means (e.g. about 0.10 to 0.20 mm versus the predetermined distance of 0.30 mm).

The first dial part 40A or 40B has the shape of a cap that is fitted over the hollow part 33 to be screwed thereon. When the first body part 30A or 30B rotates, the first dial part 40A or 40B moves together. Meanwhile, when the first dial part 40A or 40B rotates, the first body part 30A or 30B does not move and only the first dial part 40A or 40B moves.

Figure 2:
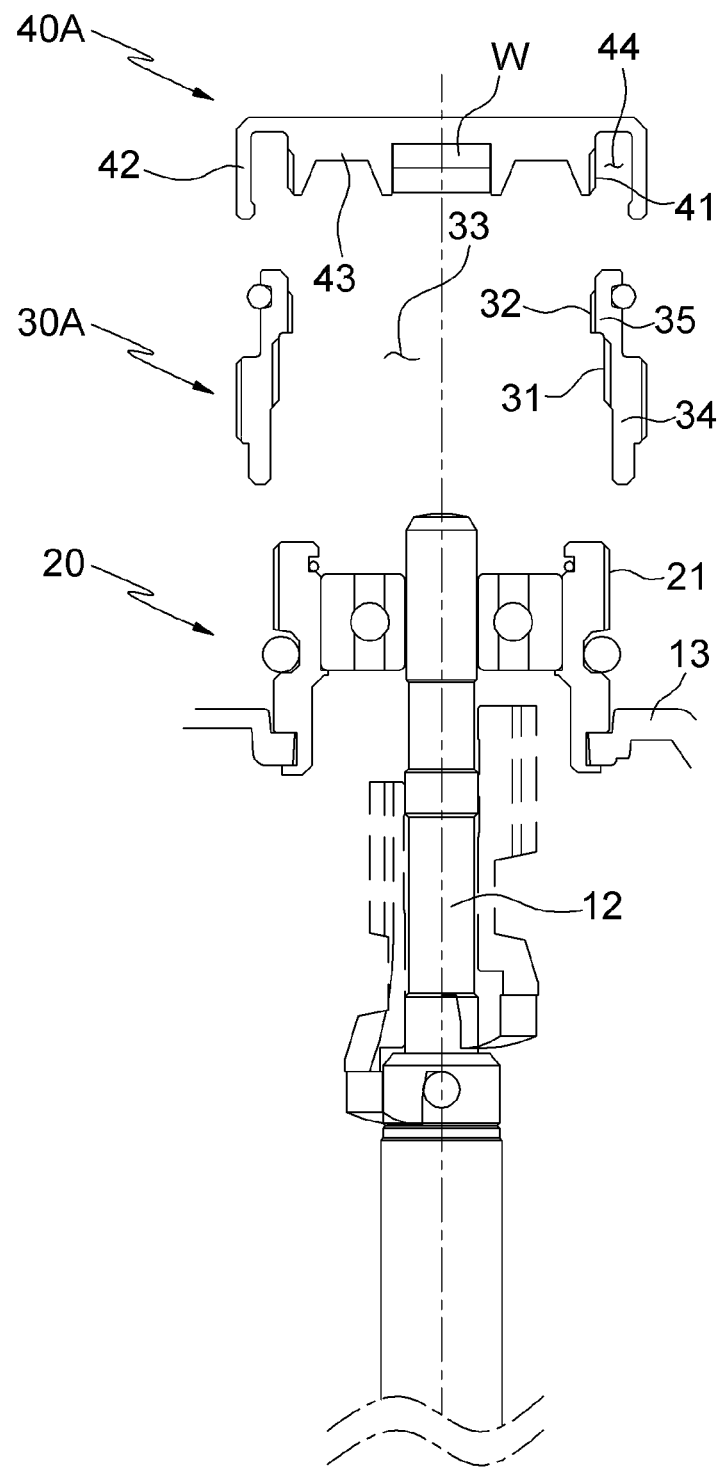
FIGS. 2 to 5 are sectional views illustrating important parts of a fishing reel according to a first embodiment of the present invention.
Figure 3:
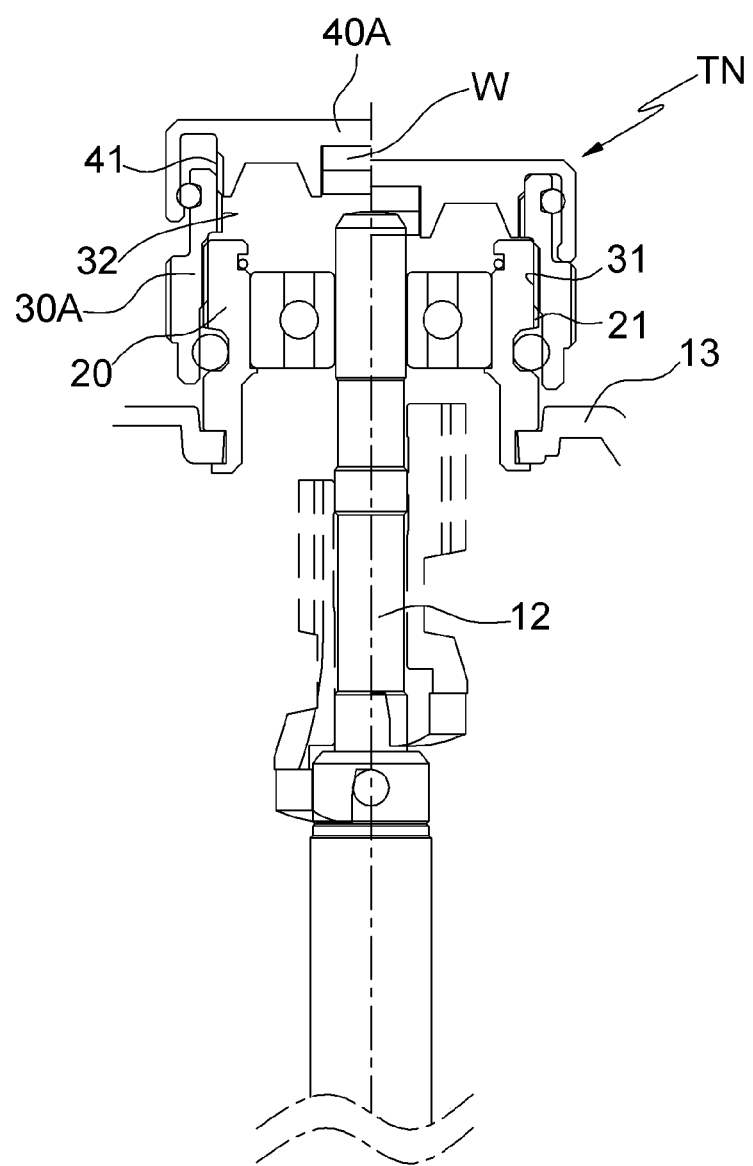

The first dial part 40A shown in FIGS. 2 and 3 has a first skirt part 42 that is connected to an edge of the first dial part and is bent inwards to surround the outer circumference of the first small inner diameter part 35. A first protrusion 43 is connected to the inner surface of the first dial part to protrude inwards. A first fitting part 44 is formed between the first skirt part 42 and the first protrusion 43 so that the first small inner diameter part 35 is inserted therein. The tension adjusting part W is provided on a central portion of the first protrusion 43 to protrude inwards. The fourth thread 41 is provided on the outer circumference of the first protrusion 43.

The tension adjusting part W may take various structures or shapes depending on the way of pressing against the spool shaft 12. Although a double washer into which an end of the spool shaft 12 is fitted is illustrated as the tension adjusting part W in the drawing, the invention is not limited thereto.

As the first skirt part 42 is fitted over the first body part 30A, a user may hold only the first skirt part 42 and rotate only the first dial part 40A separately from the first body part 30A.

Figure 4:
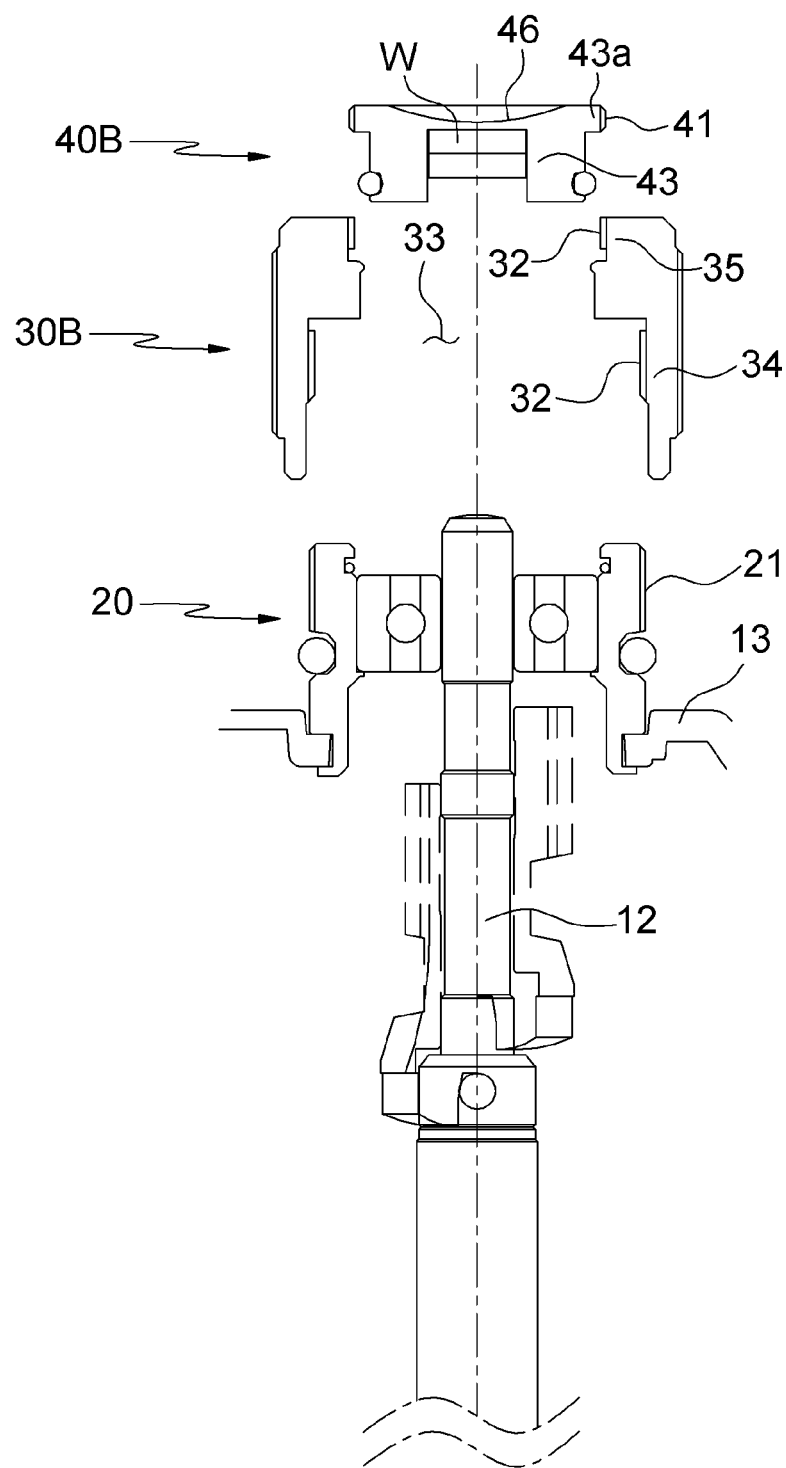
Figure 5:
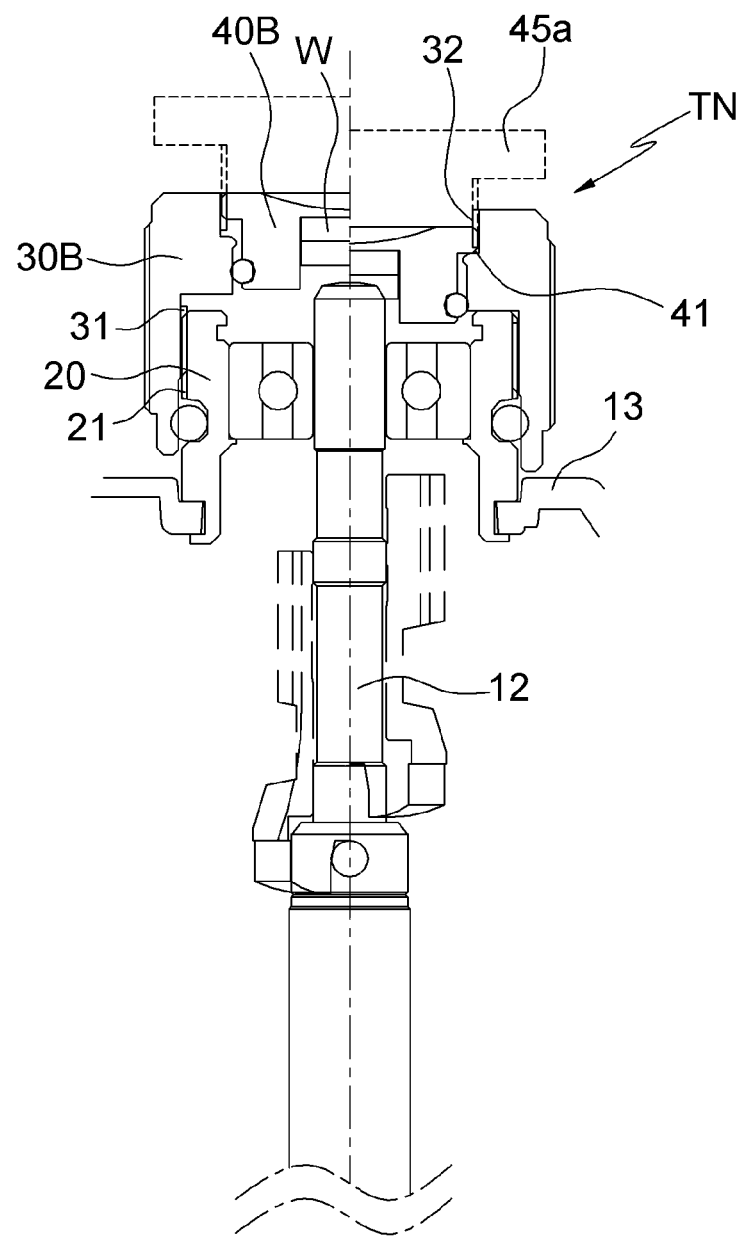

Furthermore, the first dial part 40B shown in FIGS. 4 and 5 has only the first protrusion 43 without having the first skirt part 42 on the edge thereof, so that the first dial part is screwed while being fitted into the hollow part 33 of the first body part 30B.

The first body part 30B has the second thread 32 on an inner groove of the first small inner diameter part 35.

The first dial part 40B has a flange part 43a that protrudes outwards from the edge of the first protrusion 43 to be inserted into the inner groove of the first small inner diameter part 35, and the fourth thread 41 is formed on the outer circumference of the flange part 43a.

The first dial part 40B may have on an outer surface thereof a tool insertion slot 46 such as a straight slot, so that it is rotatable using a screwdriver, a coin, or the like. Alternatively, as shown by broken lines in FIG. 5, a gripper 45a may protrude to be exposed to an outside of the first body part 30B, so that a user may grip a gripper 45a and then may rotate the first dial part.

When the first dial part 40B has the gripper 45a, the outer diameter of the gripper 45a is preferably formed smaller than the outer diameter of the first body part 30B, thus preventing the first dial part 40B from rotating separately from the first body part 30B when the first body part 30B is gripped and rotated.

The embodiment shown in FIGS. 2 and 3 and the embodiment shown in FIGS. 4 and 5 are different in only the shape of the body part and the dial part, but have the same feature in that the moving distance of the tension nut TN (in detail, the tension adjusting part W) is formed differently via the first and second adjustment means having different pitches.

According to the first embodiment, if the tension nut TN is screwed to the nut mounting part 20 by rotating the first body part 30A or 30B, due to a large pitch of the first adjustment means (first thread fastening part), the number of rotation required to move the entire tension nut TN to a coupling completion position is reduced, so that the tension nut TN may be more rapidly assembled and the range of the tension force may be adjusted coarsely by rotating only the first body part 30A or 30B.

If only the first dial part 40A or 40B is rotated after the tension nut TN has been assembled, due to the small pitch of the second adjustment means (second thread fastening part), the range of the tension force may be finely adjusted by adjusting the moving distance of the tension adjusting part W, thus allowing the tension force to be adjusted more rapidly and precisely.

In such a first embodiment, the pitches of the first and third threads 21 and 31 and the pitches of the second and fourth threads 32 and 41 may be formed in opposition to the above-described pitches. That is, the first thread fastening part may have a short pitch and the second thread fastening part may have a long pitch. Then, in the state where the tension nut TN is mounted to the nut mounting part 20, the tension adjusting part W may be rapidly rotated at small times using the first dial part 40A or 40B, and then the tension adjusting part W may be finely rotated using the first body part 30A or 30B to adjust the position.

Next, as illustrated in FIGS. 6 to 11, according to the second embodiment of the present invention, the nut mounting part 20A or 20B includes a fifth thread 22 and a sixth thread 23 that are spaced apart from each other.

The tension nut TN includes a seventh thread 51 engaging with the fifth thread 22 and an eighth thread 52 engaging with the sixth thread 23, and is configured such that the eighth thread 52 engages with the sixth thread 23 when the seventh thread 51 is tightened to the fifth thread 22 and then the tension nut is dislodged.

The first adjustment means is composed of the fifth thread 22 and the seventh thread 51 (third thread fastening part), and the second adjustment means is composed of the sixth thread 23 and the eighth thread 52 (fourth thread fastening part).

The nut mounting part 20A or 20B has double threads that are spaced apart from each other, unlike the nut mounting part 20.

Figure 6:
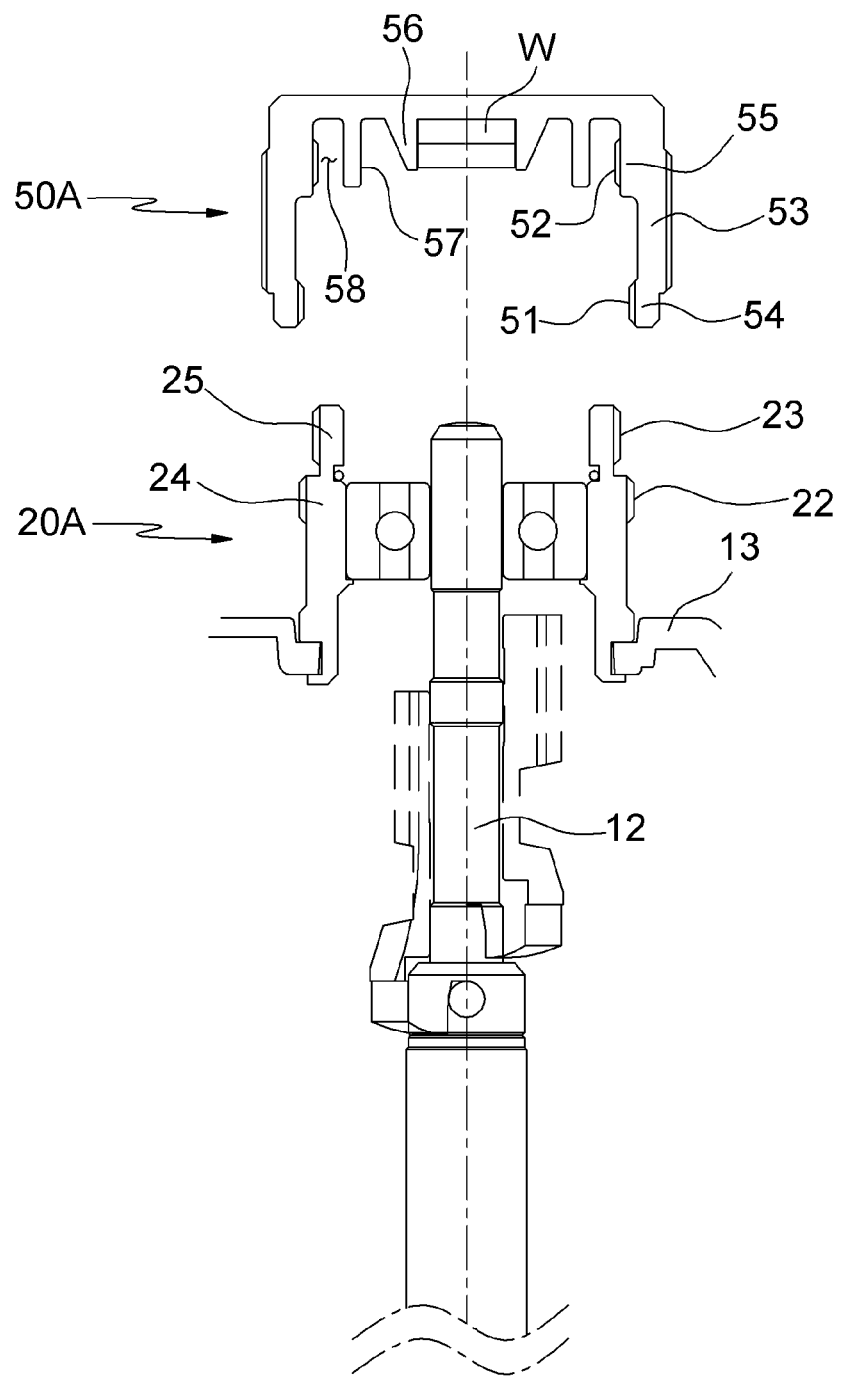
FIGS. 6 to 11 are sectional views illustrating important parts of a fishing reel according to a second embodiment of the present invention.
Figure 7:
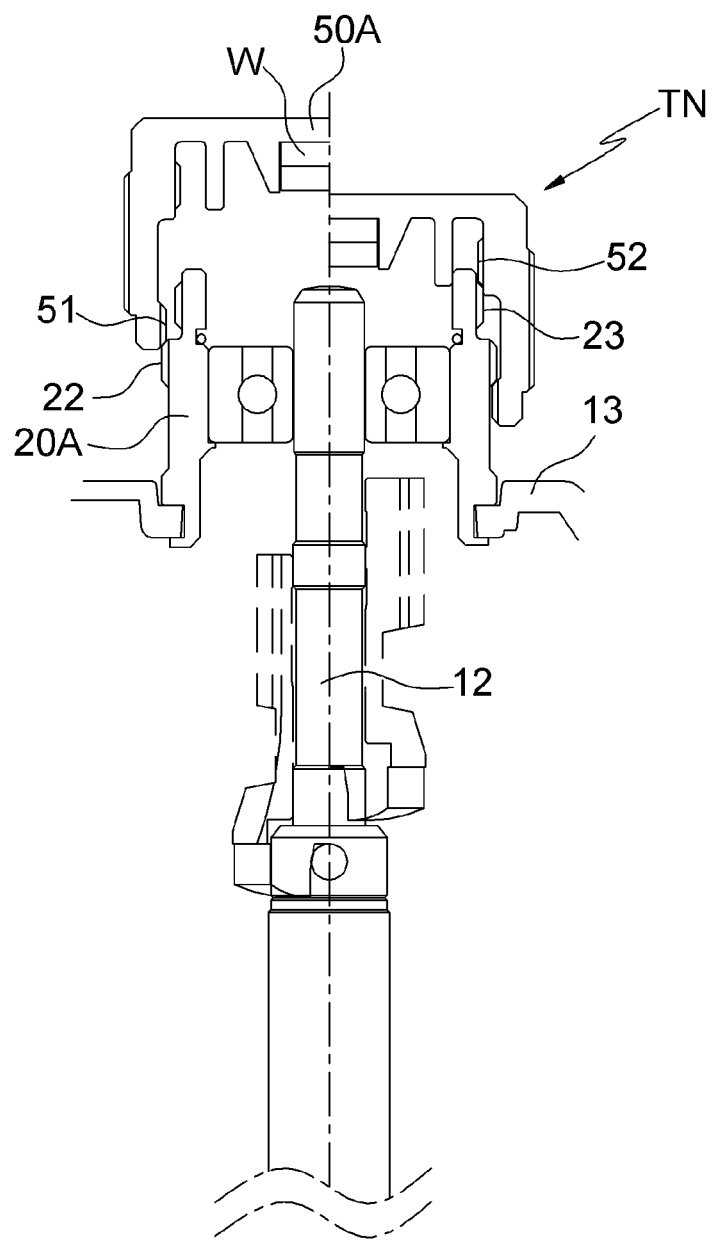
Figure 8:
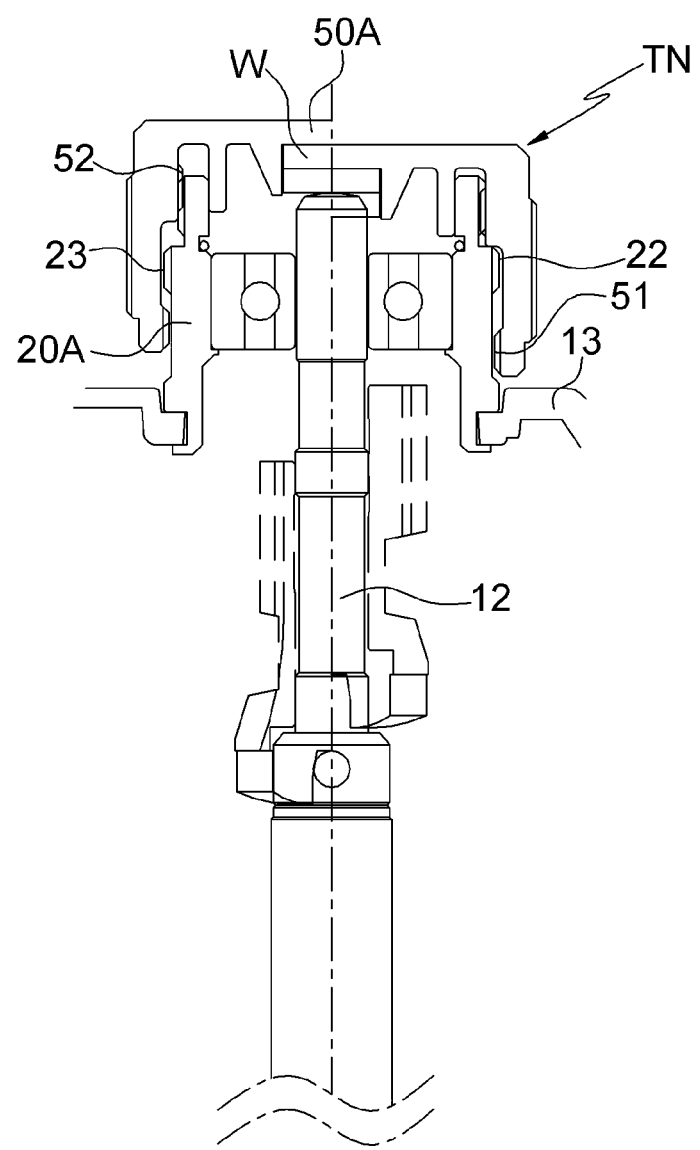

The nut mounting part 20A shown in FIGS. 6 to 8 includes a large outer diameter part 24 that is provided at an inside position, a small outer diameter part 25 that is connected to an outside of the large outer diameter part 24 and has a diameter smaller than that of the large outer diameter part 24. The fifth thread 22 is provided on the outer circumference of the large outer diameter part 24, and the sixth thread 23 is provided on the outer circumference of the small outer diameter part 25.

Furthermore, the tension nut TN shown in FIGS. 6 to 8 is a cap-shaped nut body 50A that is fitted over the nut mounting part 20A to be screwed thereto. A second skirt part 53 is connected to an edge of the nut body 50A and is bent inwards to surround the outer circumference of the nut mounting part 20A. A second protrusion 56 having the tension adjusting part W is connected to the inner surface of the central portion of the nut body.

The second skirt part 53 includes a second large inner diameter part 54 that corresponds to the outer diameter of the large outer diameter part 24, and a second small inner diameter part 55 that is connected to an outside of the second large inner diameter part 54 and corresponds to the outer diameter of the small outer diameter part 25. The seventh thread 51 is provided on the inner circumference of the second large inner diameter part 54, and the eighth thread 52 is provided on the inner circumference of the second small inner diameter part 55.

Furthermore, an inner wall 57 is provided between the second protrusion 56 and the second skirt part 53 to the same height as the second small inner diameter part 55, so that a second fitting part 58 is formed between the second skirt part 53 and the inner wall 57 and thus the small outer diameter part 25 is fitted therein.

Figure 9:
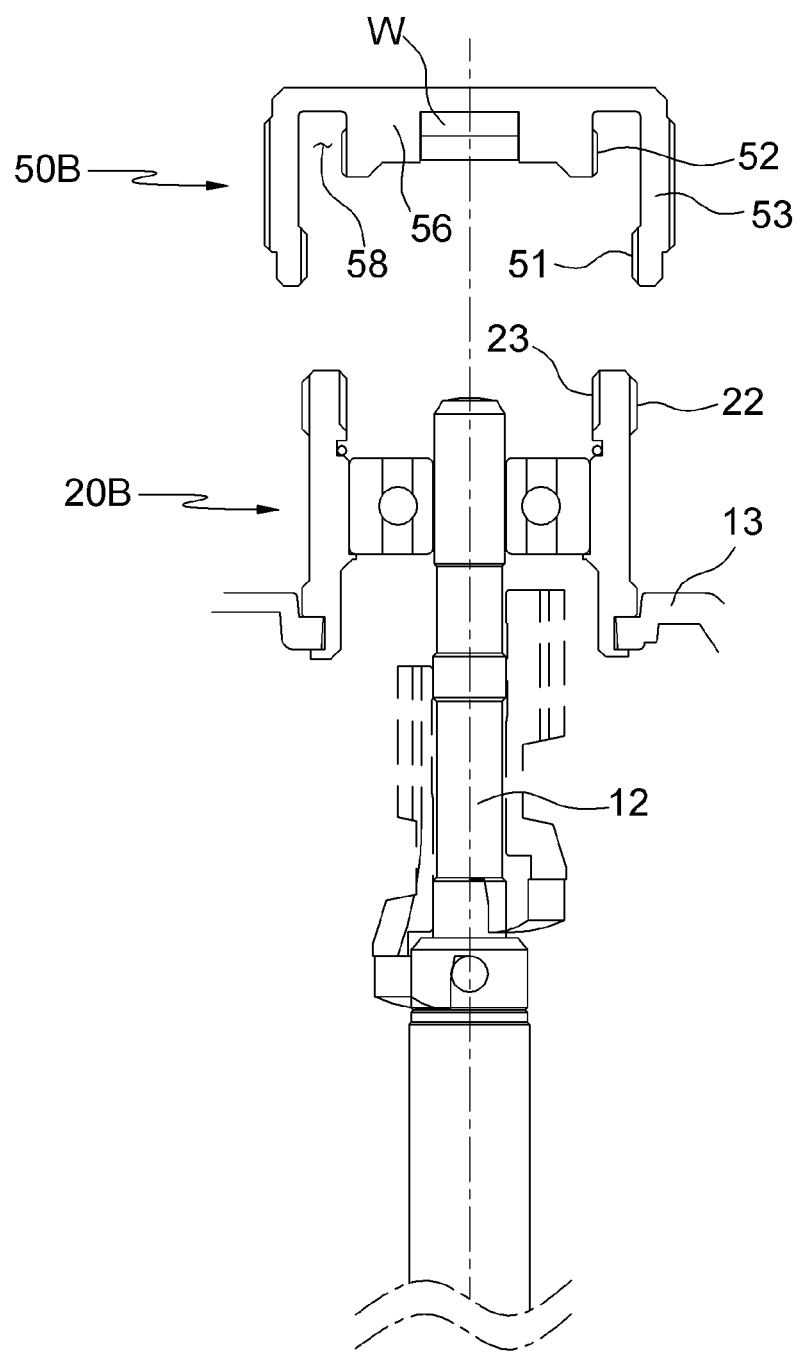
Figure 10:
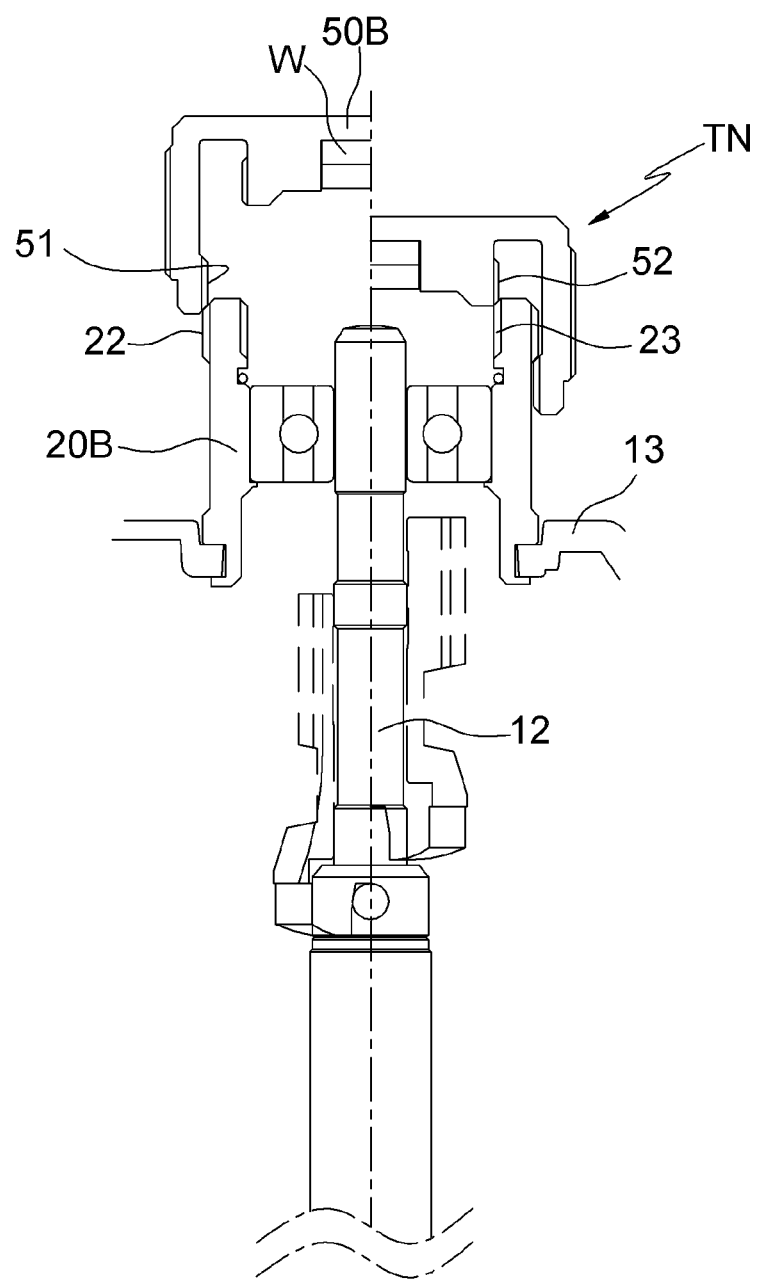
Figure 11:
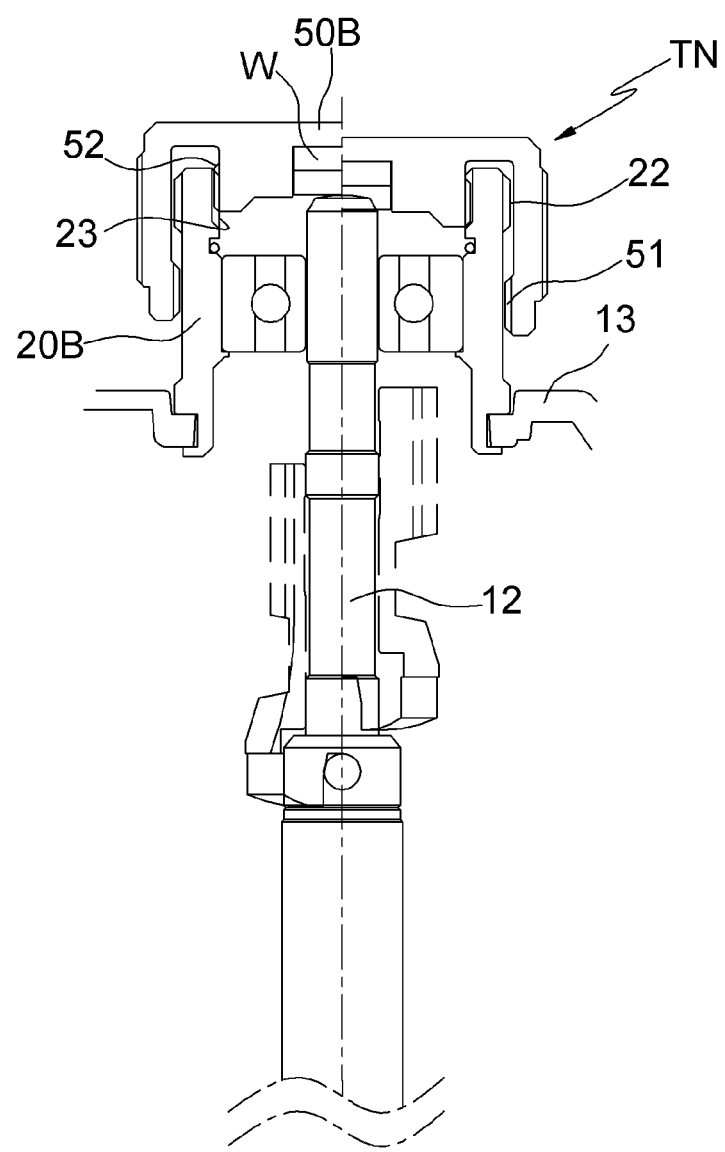

Meanwhile, the nut mounting part 20B shown in FIGS. 9 to 11 is a straight sidewall. The fifth thread 22 is provided on the outer circumference of the nut mounting part 20B, and the sixth thread 23 is provided on the inner circumference of the nut mounting part 20B, so that the fifth and sixth threads 22 and 23 are formed at the same height.

Further, the nut body 50B shown in FIGS. 9 to 11 has the second skirt part 53 similar to the nut body 50A. The nut body 50B is different from the nut body 50A in that the seventh thread 51 is provided on the inner circumference of the second skirt part 53, the eighth thread 52 is provided on the outer circumference of the second protrusion 56 having the tension adjusting part W, and the second fitting part 58 is formed between the second protrusion 56 and the second skirt part 53 without the inner wall 57.

In the second embodiment of the present invention, each helical groove width of the third thread fastening part and the fourth thread fastening part has the same size relationship as the first thread fastening part and the second thread fastening part (i.e. the pitch of the third thread fastening part is longer than the pitch of the fourth thread fastening part).

Moreover, in the second embodiment of the present invention, a spacing distance between the seventh thread 51 and the eighth thread 52 is formed larger than the overall distance of the fifth thread 22.

According to the second embodiment, if the tension nut TN, namely, the nut body 50A or 50B is screwed to the nut mounting part 20A or 20B, due to a large pitch of the first adjustment means (third thread fastening part), the number of rotation required to move the tension nut TN to the coupling completion position is reduced, so that the tension nut TN may be more rapidly assembled.

If the assembly of the tension nut TN is completed, the seventh thread 51 disengages from the fifth thread 22, so that the nut body 50A or 50B may perform idle-rotation in the nut mounting part 20A or 20B. Here, if the nut body 50A or 50B is continuously pressed inwards, the eighth thread 52 engages with the sixth thread 23. In the state where the assembly of the tension nut TN has been completed, if the nut body 50A or 50B is rotated, due to the small pitch of the second adjustment means (fourth thread fastening part), the range of the tension force may be finely adjusted by adjusting the moving distance of the tension adjusting part W, thus allowing the tension force to be adjusted more precisely.

Subsequently, as illustrated in FIGS. 12 to 18, in the third embodiment of the present invention, the nut mounting part 20 includes the ninth thread 26.

The tension nut TN includes a second body part 60A or 60B that has an idle shaft 61, the tension adjusting part W, and a tenth thread 62 engaging with the ninth thread 26, a second dial part 70A or 70B that is rotatably coupled to the idle shaft 61, and an elastic pressing member 80 that is interposed between the second body part 60A or 60B and the second dial part 70A or 70B, and exerts an elastic force to prevent the second dial part 70A or 70B from being rotated against the second body part 60A or 60B, thus allowing the second body part 60A or 60B to be rotated by the second dial part 70A or 70B when pressure is equal to or less than a predetermined pressure, and allowing the second dial part 70A or 70B to perform idle-rotation in the second body part 60A or 60B when the pressure is equal to or less than a predetermined pressure.

Thereby, the first adjustment means is composed of the ninth thread 26 and the tenth thread 62 (fifth thread fastening part), and the second adjustment means is composed of the elastic pressing member 80.

To be more specific, the ninth thread 26 is provided on the outer circumference of the nut mounting part 20, and the helical groove width of the fifth thread fastening part is formed in the same manner as the first and third thread fastening parts (i.e. pitch is formed short to facilitate the fine adjustment).

Similarly to the nut body 50A or 50B, the second body part 60A or 60B has the shape of a cap that is fitted over the outer circumference of the nut mounting part 20 to be screwed thereto. The tenth thread 62 is provided on the inner circumference of the skirt part, and the protrusion having the tension adjusting part W is provided on the central portion of the inner surface the second body part. However, the second body part is different from the nut body 50A or 50B in that a convex or concave idle shaft 61 is provided on the outer surface.

Figure 16:
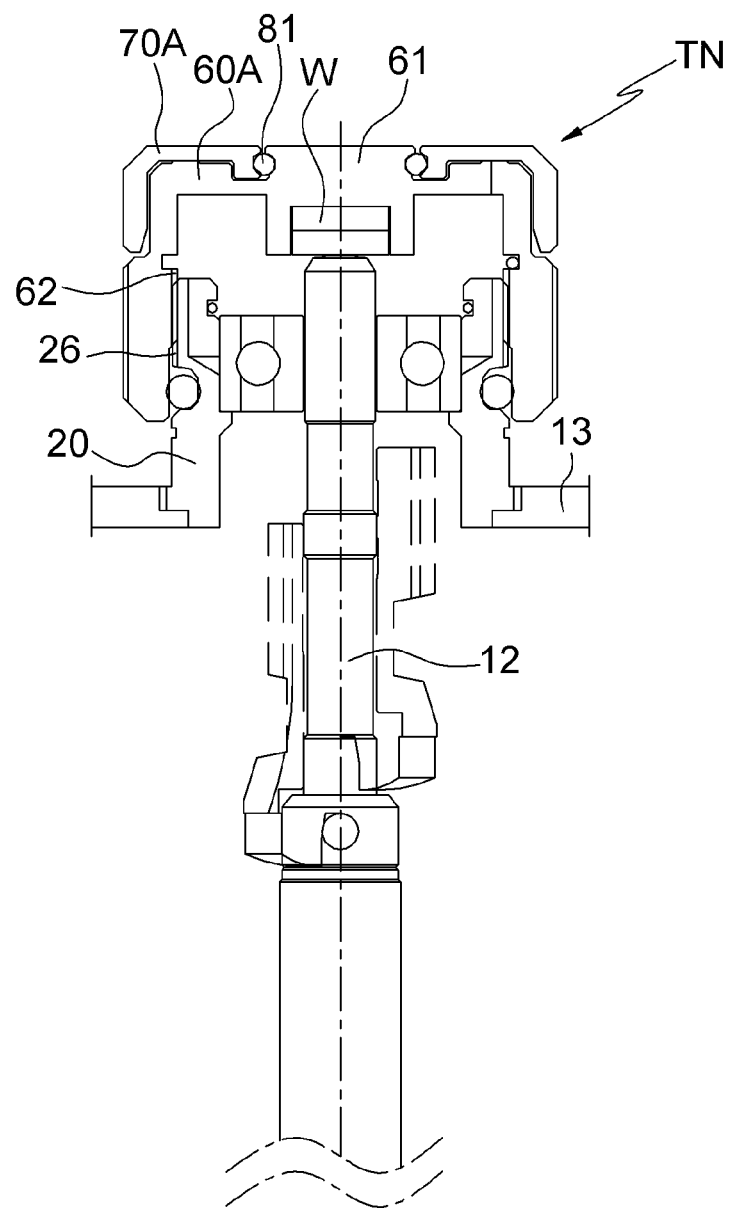
Figure 17:
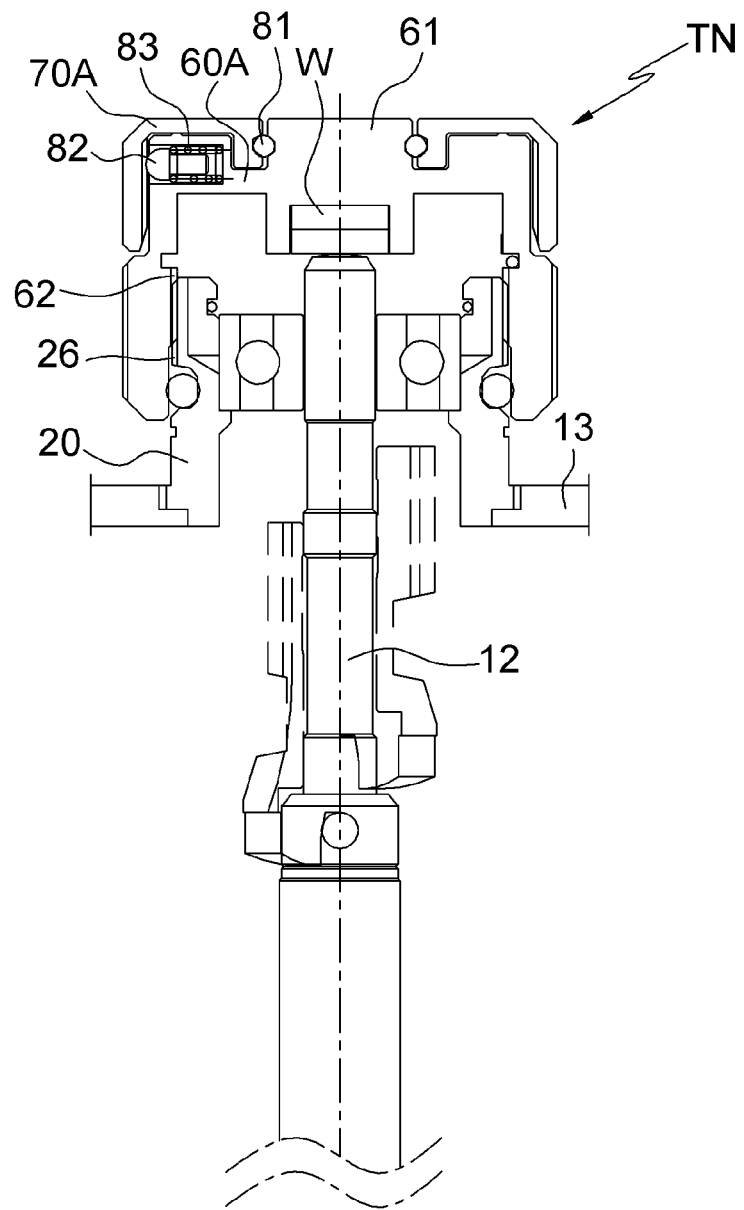
Figure 18:
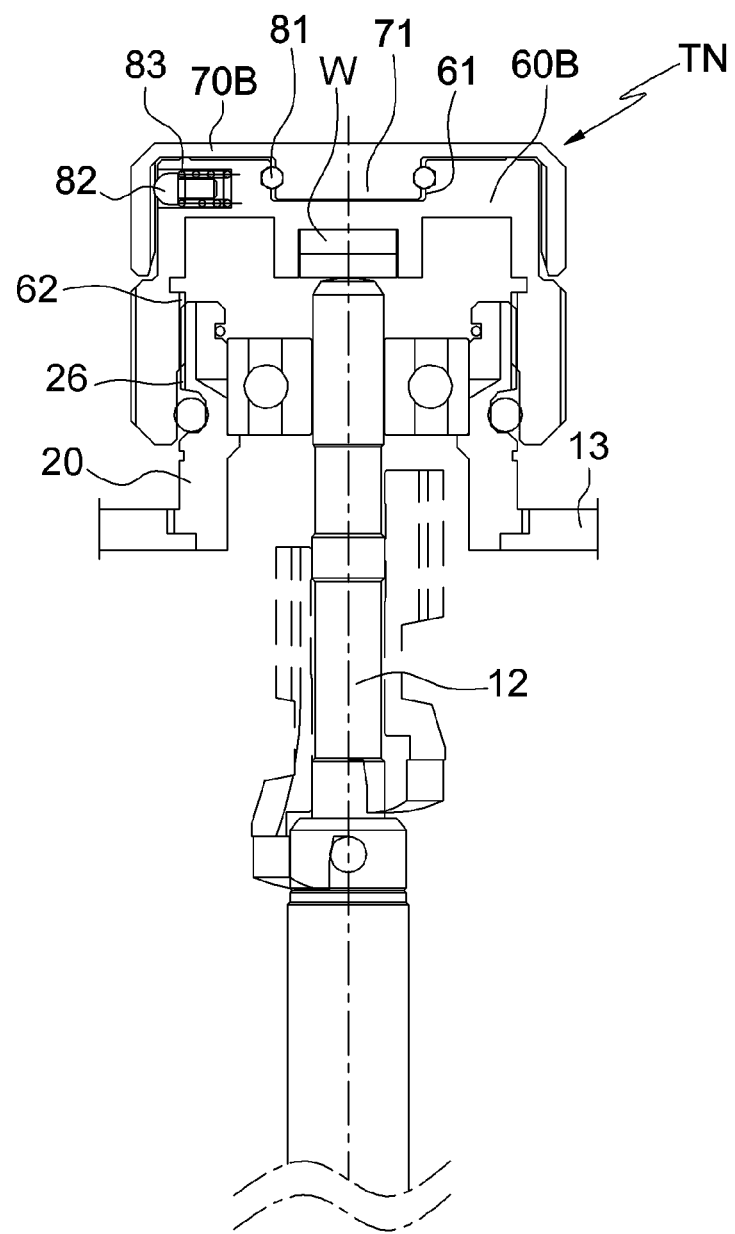

It can be seen that the second body part 60A shown in FIGS. 12 to 17 has the convex idle shaft 61 that is provided on the outer surface in the shape of a projection, and the second body part 60B shown in FIG. 18 has the concave idle shaft 61 that is provided on the outer surface in the shape of a depression.

The second dial part 70A or 70B has the shape of a cap that is fitted over the outer circumference of the second body part 60A or 60B to be screwed thereto, and has a shaft insertion part that is coupled with the idle shaft 61 in a male-and-female coupling manner to be rotatable about the idle shaft 61.

It can be seen that the second dial part 70A shown in FIGS. 12 to 17 has the shaft insertion part 71 which passes through inner and outer surfaces thereof so that the projection-shaped idle shaft 61 is fitted therein, and the second dial part 70B shown in FIG. 18 has the shaft insertion part 71 which protrudes from the inner surface thereof in the shape of the projection to be fitted into the depression-shaped idle shaft 61.

The elastic pressing member 80 includes an elastic ring 81 which is made of a material having a predetermined elastic force such as rubber, is fitted into the second body part 60A or 60B or the idle shaft 61, and applies an elastic force to prevent the idle rotation of the second dial part 70A or 70B.

Moreover, the elastic pressing member 80 further includes an elastic retaining pin 82 that is coupled to a side surface of the second body part 60A or 60B to be ejected therefrom or retracted therein, and an elastic body 83 that elastically biases the elastic retaining pin 82 outwards so that the elastic retaining pin 82 is inserted into a locking hole (not shown) of the second body part 60A or 60B. The elastic retaining pin 82 and the elastic body 83 perform a function similar to that of a kind of ball spring.

Figure 12:
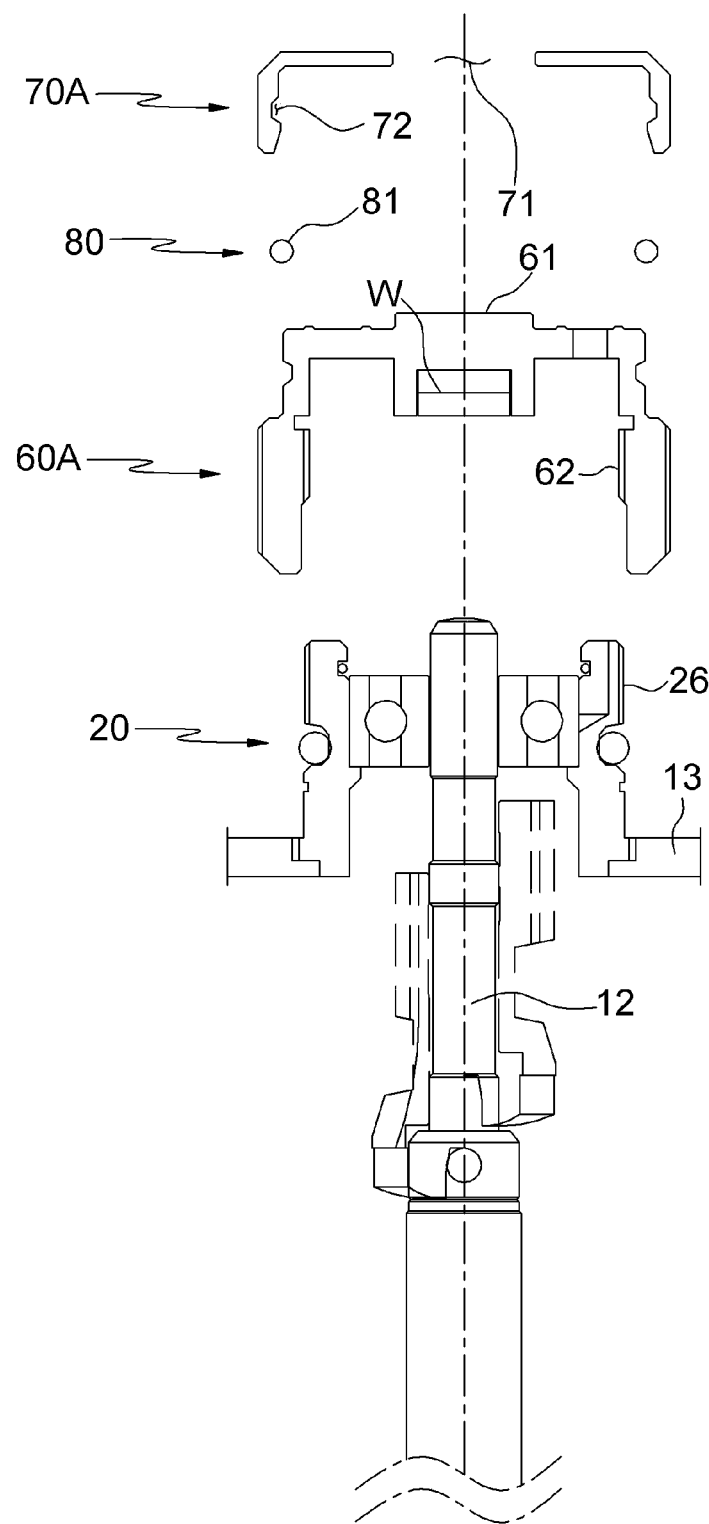
FIGS. 12 to 18 are sectional views illustrating important parts of a fishing reel according to a third embodiment of the present invention.
Figure 13:
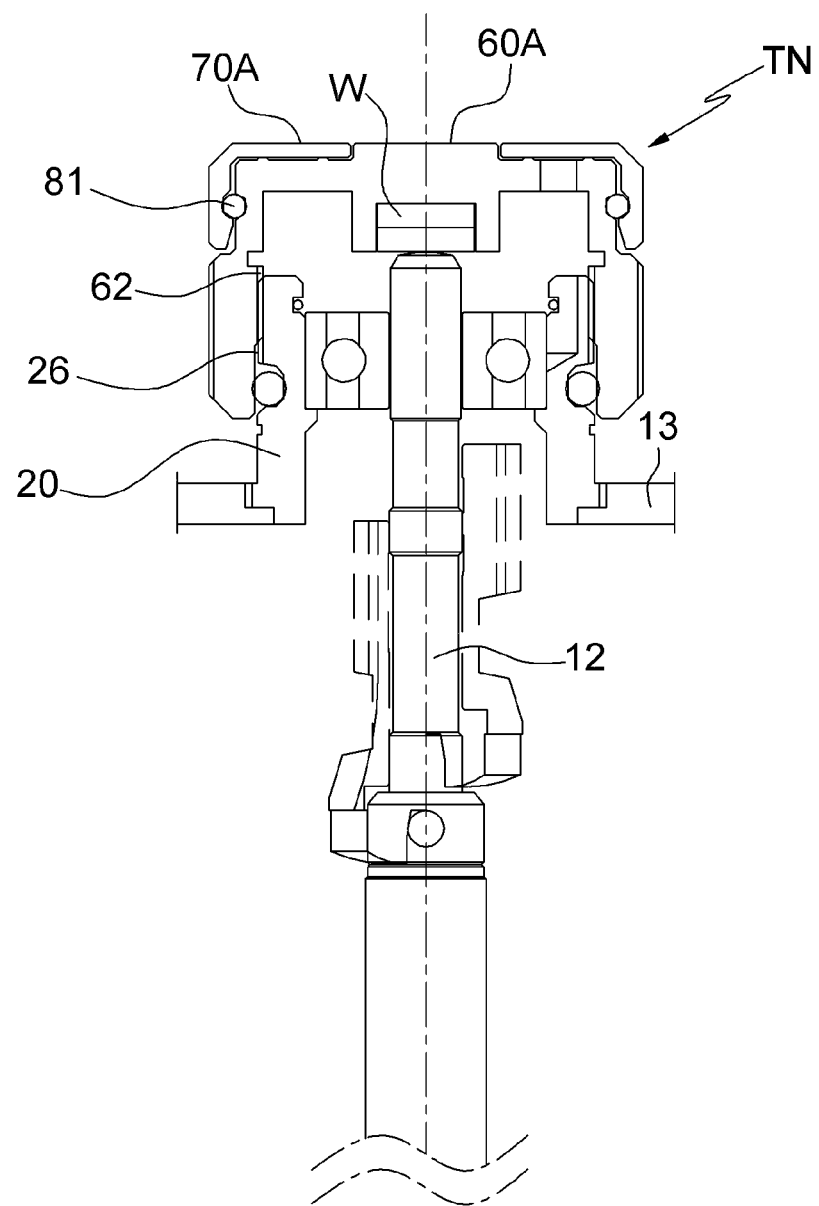

In FIGS. 12 and 13, the elastic ring 81 is fitted into the outer circumference of the second body part 60A, so that the elastic ring 81 is caught by the fitting groove 72 of the second dial part 70A.

According to the third embodiment, the second dial part 70A is restrained by the second body part 60A due to the elastic force (frictional force) of the elastic ring 81, so that the second dial part 70A does not rotate alone but rotates along with the second body part 60A unless strong external force is applied thereto.

Therefore, if the tension nut TN is fitted into the nut mounting part 20 to be screwed thereto with the second dial part 70A configured as described above being held, resistance generated by the first adjustment means (fifth thread fastening part) is less than the elastic force of the elastic ring 81 before the tenth thread 62 is tightened to the end of the ninth thread 26, so that the entire tension nut TN may be rapidly rotated by small pressure and thus the tension nut TN may be more rapidly assembled.

In the state where the tension nut TN has been screwed to a predetermined height, if the second dial part 70A is held and rotated, pressure generated by tightening the screw becomes larger than the elastic force of the elastic ring 81, so that only the second dial part 70A runs idle against the second body part 60A. In this state, if the second dial part 70A rotates leftwards or rightwards, the second body part 60A rotates finely at a relatively lower speed than that of the second dial part 70A (or stops rotating) by frictional force generated by the second adjustment means (elastic pressing member 80), so that the moving distance of the second body part 60A per rotation of the second dial part 70A is reduced, thus finely adjusting the moving distance of the tension adjusting part W and allowing the range of the tension force to be finely adjusted.

That is, when the tension nut TN of the third embodiment is assembled with the nut mounting part 20, the frictional force generated by the thread fastening is small in a predetermined height range down from an initial coupling height, so that the rotating force of the second dial part 70A is completely transmitted to the second body part 60A, and thus the second dial part 70A and the second body part 60A rotate together while forming a one-to-one correspondence.

In a last section where one end of the spool shaft 12 comes into contact with the tension adjusting part W and the frictional force is increased by tightening the screw, pressure resistant to rotation (i.e. pressure for rotating the tension nut TN) is larger than the elastic force of the elastic ring 81, so that the rotating force of the second dial part 70A is not completely transmitted to the second body part 60A and thus the second dial part 70A is rotated more than the second body part 60A (or the rotation of the second body part 60A is stopped). Consequently, the distance to which the second body part 60A rotatably moves is reduced as compared to the number of rotations of the second dial part 70A. Thus, this achieves the effect of reducing the pitch of the second adjustment means composed of the elastic ring 81 as compared to the first adjustment means of the fifth thread fastening part.

Figure 14:
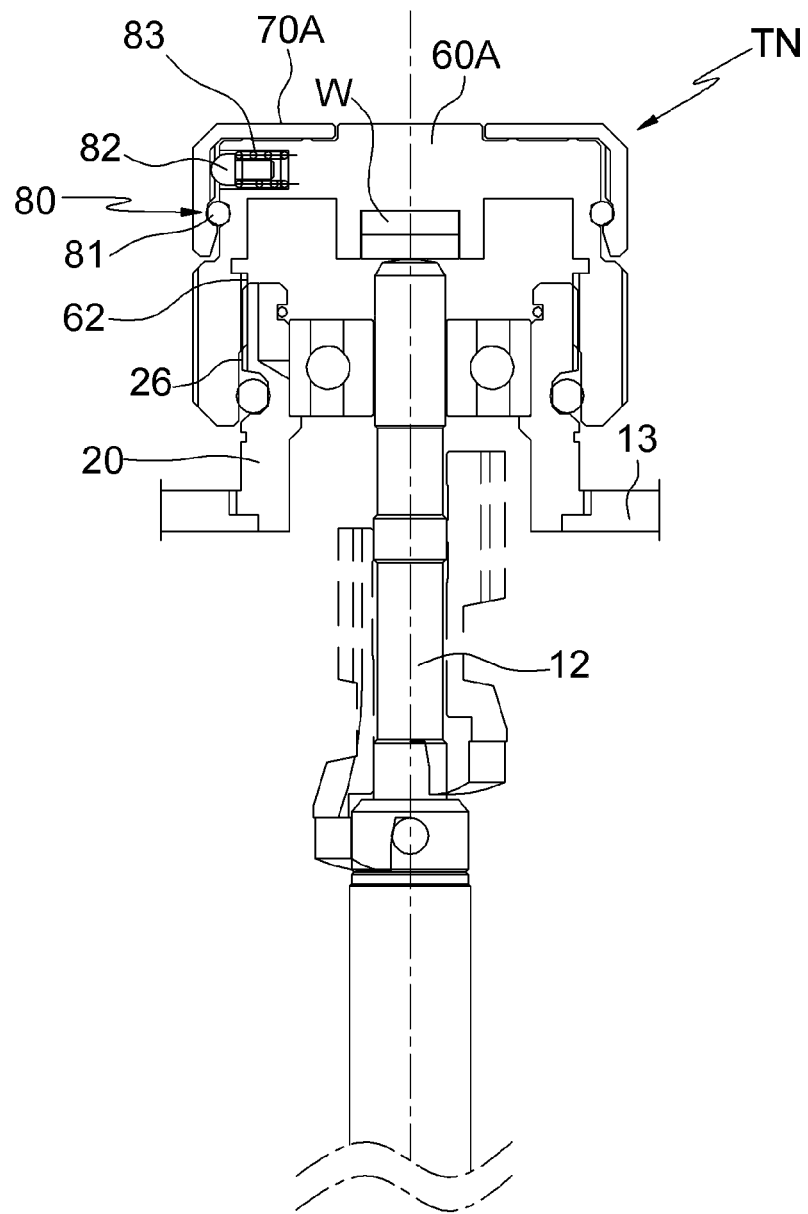

Meanwhile, the third embodiment of FIG. 14 is modifications of FIGS. 12 and 13, and is configured by combining the elastic retaining pin 82 and the elastic body 83 in addition to the elastic ring 81.

According to the third embodiment, the second dial part 70A is restrained by the second body part 60A due to the frictional force of the elastic ring 81 and the locking structure of the elastic retaining pin 82, so that the second dial part 70A does not rotate alone but rotates along with the second body part 60A unless strong external force is applied thereto.

Therefore, if the tension nut TN is fitted into the nut mounting part 20 to be screwed thereto with the second dial part 70A configured as described above being held, the elastic force of the elastic ring 81 and the locking structure of the elastic retaining pin 82 affect simultaneously, so that the second dial part 70A and the second body part 60A rotate together before the tenth thread 62 is tightened to the end of the ninth thread 26, and thus the tension nut TN may be more rapidly assembled by small pressure.

In the state where the tension nut TN has been screwed to a predetermined height, if the second dial part 70A is held and rotated, pressure generated by tightening the screw becomes larger than the elastic force of the elastic ring 81, and simultaneously the elastic retaining pin 82 moves backwards to be removed from the locking hole due to an increase in rotating pressure, so that only the second dial part 70A runs idle against the second body part 60A. In this state, if the second dial part 70A rotates leftwards or rightwards, the moving distance of the second body part 60A per rotation of the second dial part 70A is reduced, thus finely adjusting the moving distance of the tension adjusting part W and allowing the range of the tension force to be finely adjusted.

Figure 15:
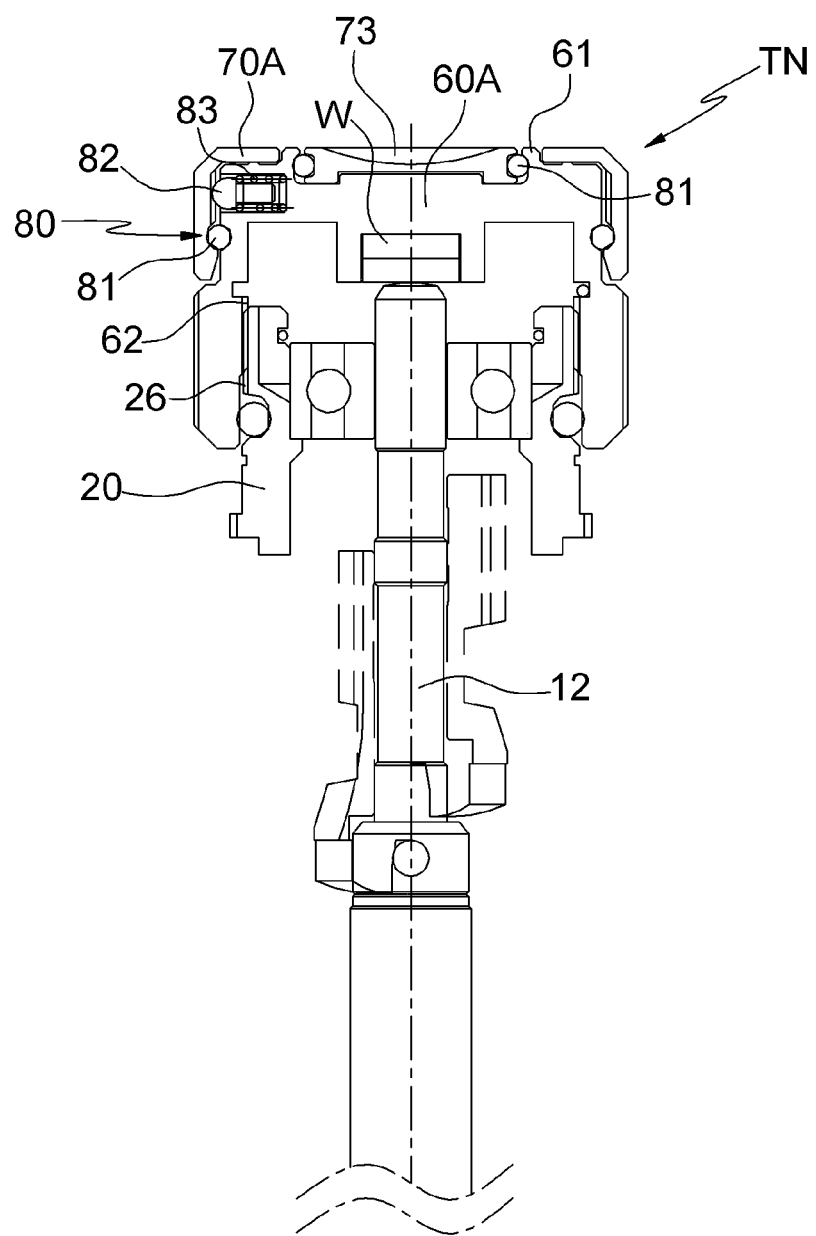

The third embodiment of FIG. 15 is the modification of FIG. 14. According to this embodiment, a rotary plate 73 having a tool insertion slot formed thereon is fitted into a receiving recess of the idle shaft 61 of the second body part 60A, with the elastic ring 81 being further interposed between the rotary plate 73 and the second body part 60A.

Such a third embodiment may adjust the pitch via the first and second adjustment means according to the above-described principle, and may more finely adjust the moving distance of the second body part 60A not by rotating the second dial part 70A but by rotating only the rotary plate 73.

The third embodiment of FIG. 16 is the modification of FIGS. 12 and 13, and remains the same operating method and principle as the embodiment of FIGS. 12 and 13 except that the elastic ring 81 is disposed between the idle shaft 61 and the shaft insertion part 71.

The third embodiment of FIG. 17 is the modification of FIG. 16, and remains the same operating method and principle as the embodiment of FIG. 16 except that the elastic retaining pin 82 and the elastic body 83 are additionally provided.

The third embodiment of FIG. 18 is the modification of FIG. 17, and remains the same operating method and principle as the embodiment of FIG. 17 except that the idle shaft 61 and the shaft insertion part 71 take a reverse male-and-female coupling structure.

As described above, the present invention provides a fishing reel, in which first and second adjustment means having different pitches are applied, so that a tension nut is more easily and rapidly assembled, and a moving distance of a tension adjusting part is controlled to be short or long by selecting the first or second adjustment means, thus allowing the position of the tension adjusting part pressing a spool shaft to be more precisely adjusted and allowing a tension force to be finely adjusted.

Although the present invention was described with reference to specific embodiments shown in the drawings, it is apparent to those skilled in the art that the present invention may be changed and modified in various ways without departing from the scope of the present invention, which is described in the following claims.

What is claimed is:

1. A fishing reel comprising:
a frame having a nut mounting part;
a tension nut screwed to the nut mounting part to adjust a distance in an axial direction of a spool shaft, and having a tension adjusting part therein to press a first end of the spool shaft and thereby adjust rotating force of the spool;
first adjustment means configured to make a moving distance per rotation of the tension nut larger or smaller than a predetermined distance; and
second adjustment means configured to make the moving distance per rotation of the tension nut smaller or larger than the predetermined distance, in opposition to the moving distance per rotation of the tension nut by the first adjustment means.

2. The fishing reel of claim 1, wherein the nut mounting part comprises a first thread, and the tension nut comprises:
a first body part having a second thread, and a third thread engaging with the first thread; and
a first dial part having the tension adjusting part, and a fourth thread engaging with the second thread,
wherein the first adjustment means is composed of the first thread and the third thread, and the second adjustment means is composed of the second thread and the fourth thread.

3. The fishing reel of claim 1, wherein
the nut mounting part comprises a fifth thread and a sixth thread that are spaced apart from each other;
the tension nut comprises a seventh thread engaging with the fifth thread and an eighth thread engaging with the sixth thread, and is configured such that the eighth thread engages with the sixth thread when the seventh thread is tightened to the fifth thread and then the tension nut is dislodged; and
the first adjustment means is composed of the fifth thread and the seventh thread; and
the second adjustment means is composed of the sixth thread and the eighth thread.

4. The fishing reel of claim 1, wherein the nut mounting part comprises a ninth thread, and the tension nut comprises:
a second body part having an idle shaft, the tension adjusting part, and a tenth thread engaging with the ninth thread;
a second dial part rotatably coupled to the idle shaft; and
an elastic pressing member interposed between the second body part and the second dial part, exerting an elastic force to prevent the second dial part from being rotated against the second body part, thus allowing the second body part to be rotated by the second dial part when pressure is equal to or less than a predetermined pressure, and allowing the second dial part to perform idle-rotation in the second body part when the pressure is equal to or less than a predetermined pressure,
wherein the first adjustment means is composed of the ninth thread and the tenth thread, and the second adjustment means is composed of the elastic pressing member.

* * * * *